United States Patent
Weinmann et al.

(10) Patent No.: US 6,294,032 B1
(45) Date of Patent: Sep. 25, 2001

(54) METHOD AND APPARATUS FOR ASSEMBLING AND ATTACHING PLASTIC CARDS AND PRINTED CARD-CARRIERS

(75) Inventors: Karlheinz Weinmann, Utting; Eduard Schmid, Untermeitingen, both of (DE)

(73) Assignee: Bowe Systec Ag, Augsburg (DE)

( * ) Notice: Subject to any disclaimer, the term of this patent is extended or adjusted under 35 U.S.C. 154(b) by 0 days.

(21) Appl. No.: 08/913,130

(22) PCT Filed: Feb. 14, 1996

(86) PCT No.: PCT/EP96/00639
§ 371 Date: Sep. 8, 1997
§ 102(e) Date: Sep. 8, 1997

(87) PCT Pub. No.: WO96/27498
PCT Pub. Date: Sep. 12, 1996

(30) Foreign Application Priority Data

Mar. 8, 1996 (DE) ................................. 195 08 283

(51) Int. Cl.$^7$ .............................. B32B 31/00; B01D 5/00; G06F 17/00; G06F 7/06
(52) U.S. Cl. ................... 156/64; 156/277; 156/378; 156/387; 235/375; 235/380; 235/435; 235/437; 235/489; 700/221; 700/225; 700/226
(58) Field of Search .................... 156/60, 64, 219, 156/277, 299, 378, 387; 427/466, 467, 406, 469; 365/103; 901/16; 29/890.1; 235/375, 380, 435, 434, 488, 489, 449, 454; 700/221, 225, 226

(56) References Cited

U.S. PATENT DOCUMENTS

| 4,384,196 | 5/1983 | McCumber et al. ............. 235/375 |
| 4,429,217 | 1/1984 | Hill et al. ...................... 235/380 |
| 5,151,582 | 9/1992 | Fuiioka .......................... 235/469 |
| 5,266,781 | * 11/1993 | Warwick et al. . |
| 5,494,544 | * 2/1996 | Hill et al. ....................... 156/64 |

FOREIGN PATENT DOCUMENTS

| 0621563 | 10/1994 | (EP) . |
| WO 93/04433 | 3/1993 | (WO) . |
| WO 94/21460 | 9/1994 | (WO) . |

OTHER PUBLICATIONS

EPO Search Report in German (Jun. 18, 1996,.)

* cited by examiner

Primary Examiner—Richard Crispino
Assistant Examiner—J. A. Lorengo
(74) Attorney, Agent, or Firm—Wolf, Greenfield & Sacks, P.C.

(57) ABSTRACT

A method of bringing together and joining plastic cards, which are provided with an identification mark, and printed card carriers associated with the respective plastic cards, comprises the following steps: providing the plastic card and the printed card carrier; detecting the identification mark of said plastic card; reading data from a database by means of said identification mark; detecting the data on said printed card carrier prior to joining said card carrier to the plastic card; determining whether the data detected on the card carrier correspond to the data read; and, provided that the data read and the data detected correspond, bringing together and joining the plastic card and the card carrier.

12 Claims, 1 Drawing Sheet

METHOD AND APPARATUS FOR ASSEMBLING AND ATTACHING PLASTIC CARDS AND PRINTED CARD-CARRIERS

FIELD OF THE INVENTION

The present invention refers to a method and an apparatus for bringing together and joining plastic cards, which are provided with an identification mark, and printed card carriers associated with the respective plastic cards.

BACKGROUND OF THE INVENTION

In general, it is possible to automatically join (apply) a variable number of plastic cards, e.g. thick plastic cards, type CR-80, to card carriers by means of known systems. The card carriers having applied thereto the plastic cards are then packed into envelopes, e.g. in an enveloping station, and they are either deposited in a scale-like mode of arrangement or subjected to further treatment, such as sorting or encircling by a plastic strip.

In a known method and in a known apparatus, presorted and personalized plastic cards are applied to presorted and personalized card carriers. The term "personalized" means in this context that the plastic card and the card carrier, respectively, have already been provided with the necessary data, such as name, address etc. The card carriers can in this case be supplied from a stack of continuous sheets or from a stack of single sheets.

In FIG. 2, a known apparatus is shown for applying plastic cards and card carriers. The apparatus is designated generally by reference numeral 200.

In this known apparatus, the plastic cards are contained in a turret means 202 comprising four magazines 204. From said turret means 202, individual plastic cards 206 are discharged and supplied to a reader 208. The supply of the individual cards to the various stations takes place via so-called stop points 210 at which the cards stop until a signal arrives from a subsequent station, said signal indicating that said subsequent station is ready to receive the card.

In the reader 208, an identification number (ID number) of the plastic card 206 is read. A processing means 212 detects and stores said identification number. The plastic card 206 is then guided to an application means 214 via a plurality of stop points 210. Prior to supplying the plastic card 206 to the application means 214, said plastic card may be provided with a gummed label at a station 216 so as to guarantee the subsequent connection to the card carrier.

The card carrier is supplied from a second direction (arrow 218), which does not correspond to the direction in which the plastic card 206 is supplied to the application means 214.

The card carrier is contained in a stack 220 which comprises the card carriers in a presorted form. As has been described hereinbefore, the card carriers have already been provided with the relevant data, e.g. the name and the address of the person receiving the card.

From said stack 220, the card carrier is supplied to a reader 222, which reads an identification number printed on said card carrier. This identification number is compared (arrow 224) with the identification number of the card occupying the last stop point prior to the application means 214. If the identification numbers correspond, the plastic card and the card carrier will be connected.

In this known apparatus 200, all components are controlled by the same system clock, i.e. the number of strokes elapsing until a plastic card reaches the application means 214 after the detection of the identification number at 208 is known, so that, depending on this known transit time, the supply of the card carriers from the stack 220 and the examination of the identification numbers can be controlled such that the card carrier will arrive at the application means 214 at the same time as the plastic card 206 belonging to this card carrier.

One disadvantage of this known apparatus is to be seen in the fact that, for the purpose of associating the respective card carrier with a complementary plastic card, it is necessary that the identification number is printed on said card carrier.

In contrast to the plastic card where the identification number and additional personal data are stored e.g. in a magnetic strip, i.e. they are not easily discernable from outside, these additional personal data are visibly printed on the printed card carrier. This is disadvantageous especially with regard to the necessary data privacy.

SUMMARY OF THE INVENTION

It is a major object of the present invention to further develop a method and an apparatus which are used for bringing together and joining plastic cards and printed card carriers in such a way that sufficient data privacy is guaranteed.

The present invention provides a method for bringing together and joining plastic cards, which are provided with an identification mark, and printed card carriers associated with the respective plastic cards, comprising the steps of:

a) providing the plastic card and the printed card carrier;

b) detecting the identification mark of said plastic card;

c) reading data from a database by means of said identification mark;

d) detecting the data on said printed card carrier prior to joining said card carrier to the plastic card;

e) determining whether the data on the card carrier detected in step d) correspond to the data read in step c); and f) provided that the data read and the data detected correspond, bringing together and joining the plastic card and the card carrier.

The present invention provides an apparatus for bringing together and joining plastic cards, which are provided with an identification mark, and printed card carriers associated with the respective plastic cards, said apparatus comprising:

a first carrier means containing the plastic cards;

a first detection means for detecting the identification mark of the plastic card;

a database means from which data can be read by means of said identification mark;

a second carrier means containng the printed card carriers;

a second detection means for detecting data on said printed card carrier;

a processing means which determines whether the data read from the database by means of the identification mark correspond to the data detected on the card carrier; and a bringing-together and joining means used for bringing together and joining the plastic card and the card carrier, provided that the data read from the database correspond to the data detected on the card carrier.

BRIEF DESCRIPTION OF THE DRAWINGS

In the following, a preferred embodiment of the present invention will be explained in detail making reference to the drawings enclosed, in which.

DESCRIPTION OF THE PREFERRED EMBODIMENT

Figure 1:
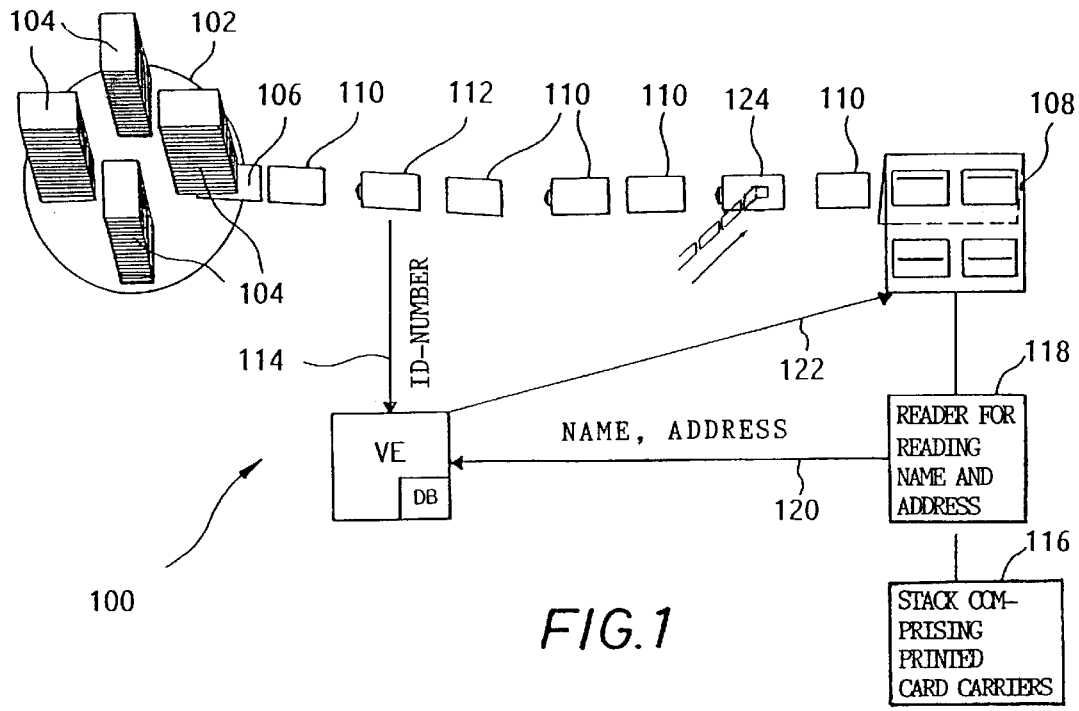
FIG. 1 shows an apparatus according to the present invention which is suitable for carrying out the method according to the present invention.
Figure 2:
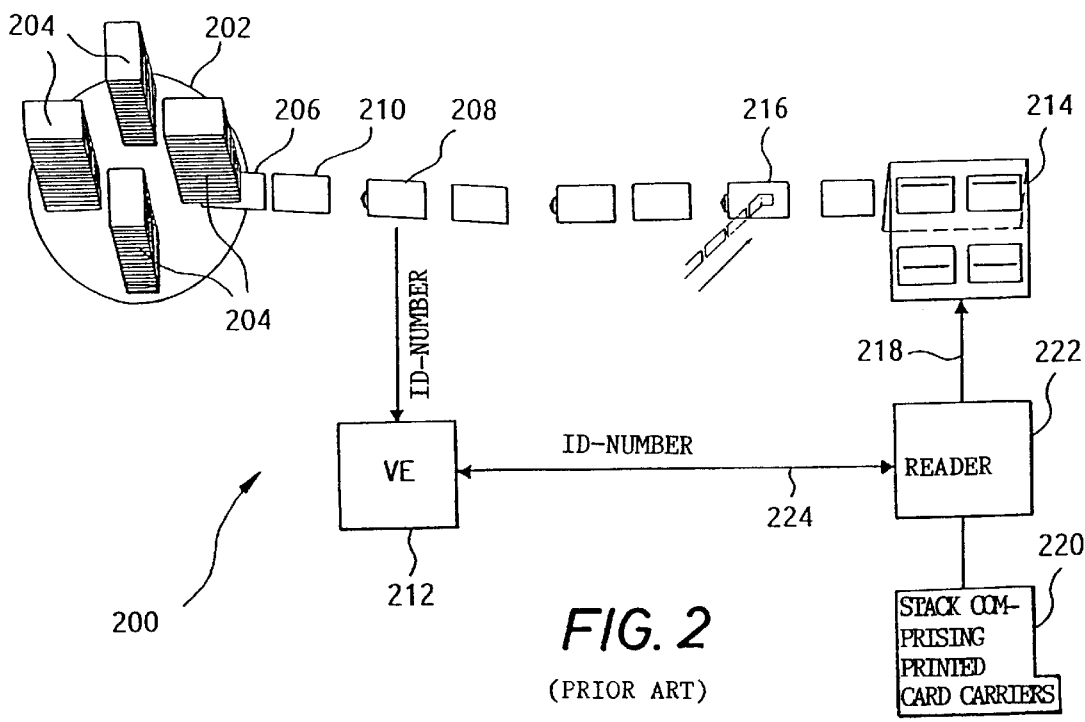
FIG. 2 shows an apparatus according to the prior art which carries out a method for bringing together and joining plastic cards and printed card carriers according to the prior art.

FIG. 1 shows an apparatus for bringing together and joining plastic cards and printed card carriers. The apparatus is designated generally by reference numeral 100.

A first carrier means 102, which, in this embodiment, is constructed as a turret, comprises four magazines 104 containing plastic cards 106. The movement of said plastic cards 106 from the turret 102 to a bringing together and joining means 108, which is also referred to as application means, takes place via so-called stop points 110 in a manner known per se among those skilled in the art. The general function principle has already been described hereinbefore.

The apparatus 100 includes a first detection means 112 detecting an identification number (ID number) of the plastic card 106. This detection is carried out e.g. by reading a chip, a magnetic strip or a bar code. The type of detection depends on the manner in which the identification number is applied to the card 106.

The first detection means 112 is connected to a processing means VE and a database means DB via a data line 114. Although these means are shown as a unit in the case of this embodiment, this is not absolutely necessary, i.e. the processing means and the database means can definitely also be implemented as individual devices.

In a second carrier means 116 that can be implemented in an arbitrary manner which is known per se, the printed card carriers, which have have already been provided with the respective data, such as name and address, are arranged in a sorted sequence. After the second carrier means 116, a second detection means 118 is arranged, which detects the data printed on the card carrier, said detection being carried out e.g. by video. The second detection means 118 is connected to the processing means VE via a data line 120. Via this data line, the data detected by said second detection means 118 are transferred to the processing means VE.

The processing means VE is connected to the application means 108 via an additional data line 122.

In the following, the method according to the present invention will be described, said method being carried out by means of the apparatus according to FIG. 1.

The plastic cards provided in the turret 102 are moved to the first detection means 112 where their identification number is detected and transferred to the database DB; from said database DB, data are read by means of the identification mark, said data being then stored in the processing means VE for further processing.

From the second carrier means 116, a card carrier is supplied to the reader 118, which transfers the data contained on the card carrier to the processing means VE via the data line 120.

The processing means VE determines whether the data read from the data base DB correspond to the data that have been received via the data line 120.

If this is the case, the processing means supplies an appropriate signal to the application means 108 via the data line 122, whereupon said application means 108 connects the plastic card 106 to the card carrier.

When this connection has been carried out, the card carrier and the plastic card are subjected to further processing, e.g. packing into envelopes etc., in a manner known per se among those skilled in the art.

The apparatus shown in FIG. 1 additionally comprises a labeller 124, which applies a gummed label to the plastic card before said plastic card is connected to the card carrier.

What is claimed is:

1. A method of bringing together and joining plastic cards, which are provided with an identification mark, and printed card carriers associated with the respective plastic cards, comprising the steps of:

a) providing the plastic card and the printed card carrier;

b) detecting the identification mark of said plastic card;

c) reading data from a database by means of said identification mark;

d) detecting data on said printed card carrier prior to joining said card carrier to the plastic card, said data comprising at least one of a name and an address of a person to whom a plastic card is to be sent;

e) determining whether the data on the card carrier detected in step d) correspond to the data read in step c); and f) provided that the data read and the data detected correspond, bringing together and joining the plastic card and the card carrier.

2. A method according to claim 1, further comprising the following step carried out prior to step f):

applying a gummed label to the plastic card.

3. A method according to claim 1, wherein the data read and the data detected include the name and address of a person.

4. An apparatus for bringing together and joining plastic cards, which are provided with an identification mark, and printed card carriers associated with the respective plastic cards, comprising:

a first carrier means containing the plastic cards;

a first detection means for detecting the identification mark of the plastic card;

a database means from which data can be read by means of said identification mark;

a second carrier means containing the printed card carriers;

said printed card carriers bearing printed data comprising at least one of the name and an address of a person who is to be sent a corresponding plastic card;

a second detection means for detecting said at least one of a name and an address on said printed card carrier;

a processing means which determines whether the data read from the database by means of the identification mark correspond to the printed data detected on the card carrier; and a bringing-together and joining means used for bringing together and joining the plastic card and the card carrier, provided that the data read from the database correspond to the data detected on the card carrier.

5. An apparatus according to claim 4, further comprising a labeller which applies a gummed label to the plastic card.

6. An apparatus according to claim 4, wherein the data read and the data detected include the name and address of a person.

7. A method of bringing together and joining plastic cards, which are provided with an identification mark, and printed card carriers associated with the respective plastic cards, comprising the steps of:

a) providing the plastic card and the printed card carrier;
b) detecting the identification mark of said plastic card;
c) reading data from a database by means of said identification mark, said database containing information about a plurality of persons to whom plastic cards are to be sent;
d) detecting data on said printed card carrier prior to joining said card carrier to the plastic card, said data comprising at least one of a name and an address of a person to whom a plastic card is to be sent;
e) determining whether the data on the card carrier detected in step d) correspond to the data read in step c); and
f) provided that the data read and the data detected correspond, bringing together and joining the plastic card and the card carrier.

8. A method according to claim 7, further comprising the following step carried out prior to step f):
apply a gummed label to the plastic card.

9. A method according to claim 7, wherein the data read and the data detected include the name and address of a person.

10. An apparatus for bringing together and joining plastic cards, which are provided with an identification mark, and printed card carriers associated with the respective plastic cards, comprising:
a first carrier means containing the plastic cards;
a first detection means for detecting the identification mark of the plastic card;
a database means from which data can be read by means of said identification mark, the database means including a database containing information about a plurality of persons to whom plastic cards are to be sent;
a second carrier means containing the printed card carriers;
said printed card carriers bearing printed data comprising at least one of the name and an address of a person who is to be sent a corresponding plastic card;
a second detection means for detecting said at least one of a name and an address on said printed card carrier;
a processing means which determines whether the data read from the database by means of the identification mark correspond to the printed data detected on the card carrier; and
a bringing-together and joining means used for bringing together and joining the plastic card and the card carrier, provided that the data read from the database correspond to the data detected on the card carrier.

11. An apparatus according to claim 10, further comprising a labeller which applies a gummed label to the plastic card.

12. An apparatus according to claim 10, wherein the data read and the data detected include the name and address of a person.

* * * * *